United States Patent
Nishimura et al.

(10) Patent No.: US 7,727,649 B2
(45) Date of Patent: Jun. 1, 2010

(54) POLYMER ELECTROLYTE FUEL CELL SYSTEM

(75) Inventors: Katsunori Nishimura, Hitachiota (JP); Yuki Okuda, Hitachi (JP); Jinichi Imahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 11/627,429

(22) Filed: Jan. 26, 2007

(65) Prior Publication Data

US 2007/0281197 A1 Dec. 6, 2007

(30) Foreign Application Priority Data

May 30, 2006 (JP) ............... 2006-149093

(51) Int. Cl.
 *H01M 8/04* (2006.01)
 *H01M 8/10* (2006.01)

(52) U.S. Cl. .................... 429/26; 429/32; 261/101

(58) Field of Classification Search .................... 429/26, 429/30, 32; 261/100, 101
See application file for complete search history.

(56) References Cited

U.S. PATENT DOCUMENTS

| | | | |
|---|---|---|---|
| 5,382,478 A * | 1/1995 | Chow et al. ................ 429/26 |
| 6,475,652 B2 * | 11/2002 | Grasso et al. ............. 429/26 X |
| 6,511,052 B1 * | 1/2003 | Tonkin et al. .............. 261/101 |
| 6,613,467 B1 * | 9/2003 | Chizawa et al. ............... 429/26 |
| 6,766,817 B2 | 7/2004 | Da Silva |
| 6,918,404 B2 | 7/2005 | Da Silva |
| 7,066,586 B2 | 6/2006 | Da Silva |

FOREIGN PATENT DOCUMENTS

| | | |
|---|---|---|
| JP | 11-354134 | 12/1999 |
| JP | 2004-206951 | 7/2004 |
| JP | 2005-040675 | 2/2005 |

OTHER PUBLICATIONS

Email from Elson Silva, dated May 9, 2008, subject IDS request for US 20070281197.

* cited by examiner

*Primary Examiner*—Stephen J. Kalafut
(74) *Attorney, Agent, or Firm*—Antonelli, Terry, Stout & Kraus, LLP.

(57) ABSTRACT

A polymer electrolyte fuel cell comprises a fuel cell stack and a humidifier. The fuel cell stack includes plural cells in which each cell has a pair of electrodes and a proton-conductive electrolyte membrane arranged between the pair of electrodes, wherein an oxidant gas or a fuel gas passes through the humidifier before being fed to the fuel cell stack, and wherein a wet gas containing water or water vapor also passes through the humidifier. In the fuel cell, the humidifier includes a porous separating layer and a hydrophilic water-releasing layer, wherein the separating layer is configured to separate the wet gas from the oxidant gas or the fuel gas in the humidifier, and wherein the hydrophilic water-releasing layer is disposed in a side of the oxidant gas or the fuel gas to the separating layer in the humidifier.

20 Claims, 4 Drawing Sheets

POLYMER ELECTROLYTE FUEL CELL SYSTEM

This present invention is based on Japanese patent application No. 2006-149093 filed on May 30, 2006, the entire contents of which are incorporated herein by reference.

BACKGROUND OF THE INVENTION

1. Field of the Invention

The present invention relates to polymer electrolyte fuel cells including humidifiers with humidifying filters.

2. Description of the Related Art

A polymer electrolyte fuel cell (hereinafter also referred to as "PEFC") includes a stack of cells and separators. The cells each include a pair of electrodes (anode and cathode) and a proton-conductive solid polymer electrolyte membrane arranged between the pair of electrodes. The separators are configured to separate a fuel gas (anode gas) (reductant), such as the hydrogen, from an oxidant gas (cathode gas), such as the oxygen. The separators are also called as bipolar plates and play a role to guide the fuel gas and the oxidant gas into the anode and the cathode, respectively.

When a separator is made of a metal or carbon having electric conductivity, a fuel cell stack may be configured by stacking plural cells so that the separator is disposed between an anode of one cell and a cathode of an adjacent cell. The resulting stacked body (fuel cell stack) can work by collecting current from both ends of the stack.

Such a fuel cell stack may further include a cooling separator configured to allow a coolant to pass through between cells, so as to eliminate heat generated along with power generation.

Electrolyte membranes for use in polymer electrolyte fuel cells (PEFCs) are configured to allow protons (hydrogen ions) to move therein generally with an assistance of water (moisture) present in the membranes. If electrolyte membranes contain insufficient amounts of water, the movement of proton is prevented and the cell voltage decreases. Accordingly, electrolyte membranes should be protected from excessive drying, in order to generate electric power satisfactorily in the polymer electrolyte fuel cell (PEFC).

As a possible solution to avoid excessive drying of electrolyte membranes, there has been proposed a technique of adding an appropriate amount of water vapor (moisture) to a fuel gas or an oxidant gas, and feeding the humidified gas to polymerelectrolyte fuel cells (e.g., JP-A No. 2005-40675, JP-A No. 2004-206951, and JP Patent No. 3029416).

However, the humidifying technique in related art has following disadvantages. In the humidifier, when a dry gas is humidified by contacting a water-permeable layer which separates a wet gas containing a large amount of water vapor from the dry gas, and the water-permeable layer comprises only one layer, it may be difficult to humidify the dry gas appropriately in the case that the operating conditions of fuel cells vary, such as gas flow rates. For example, if the flow rate of the wet gas is relatively smaller than that of the dry gas, the dry gas may not be sufficiently humidified. If it is relatively large, the dry gas is excessively humidified.

SUMMARY OF THE INVENTION

Under these circumstances, it is an object of the present invention to provide a polymer electrolyte fuel cell including a humidifier that can appropriately humidify a dry gas even when operation conditions vary, such as a flow rate of the dry gas or humidifying gas.

(1) According to an embodiment of the present invention, a polymer electrolyte fuel cell comprises a fuel cell stack and a humidifier, wherein the stack includes plural cells in which each cell has a pair of electrodes and a proton-conductive electrolyte membrane arranged between the pair of electrodes; wherein an oxidant gas or a fuel gas passes through the humidifier before being fed to the fuel cell stack; and wherein a wet gas containing water or water vapor also passes through the humidifier. In the fuel cell, the humidifier includes a porous separating layer and a hydrophilic water-releasing layer, wherein the separating layer is configured to separate the wet gas from the oxidant gas or the fuel gas (dry gas) in the humidifier, and wherein the hydrophilic water-releasing layer is disposed in a side of the dry gas (the oxidant gas or the fuel gas) to the separating layer in the humidifier.

(2) According to another embodiment of the present invention, a polymer electrolyte fuel cell comprises a fuel cell stack and a humidifier, wherein the stack includes plural cells in which each cell has a pair of electrodes and a proton-conductive electrolyte membrane arranged between the pair of electrodes; wherein an oxidant gas passes through the humidifier before being fed to the fuel cell stack; and wherein a cathode exhaust gas exhausted from the fuel cell stack passes through the humidifier. In this fuel cell, the humidifier includes a porous separating layer and a hydrophilic water-releasing layer, wherein the separating layer is configured to separate the cathode exhaust gas from the oxidant gas, and wherein the hydrophilic water-releasing layer is disposed a side of the oxidant gas to the separating layer in the humidifier.

In the above invention (1), the following modifications and changes can be made.

(i) A hydrophilic water-absorbing layer is disposed in the other side of the separating layer where the wet gas flows.

(ii) The water-releasing layer may have a corrugated structure.

(iii) The water-absorbing layer may also have a corrugated structure.

According to embodiments of the present invention, there are provided polymer electrolyte fuel cells (PEFCs) that can appropriately humidity a dry gas to be fed to a fuel cell stack even when operating conditions, such as flow rates of dry gas and wet gas, vary.

DETAILED DESCRIPTION OF THE PREFERRED EMBODIMENTS

Some preferred embodiments of the present invention will be described below, which by no means limit the scope of the present invention.

Figure 1:
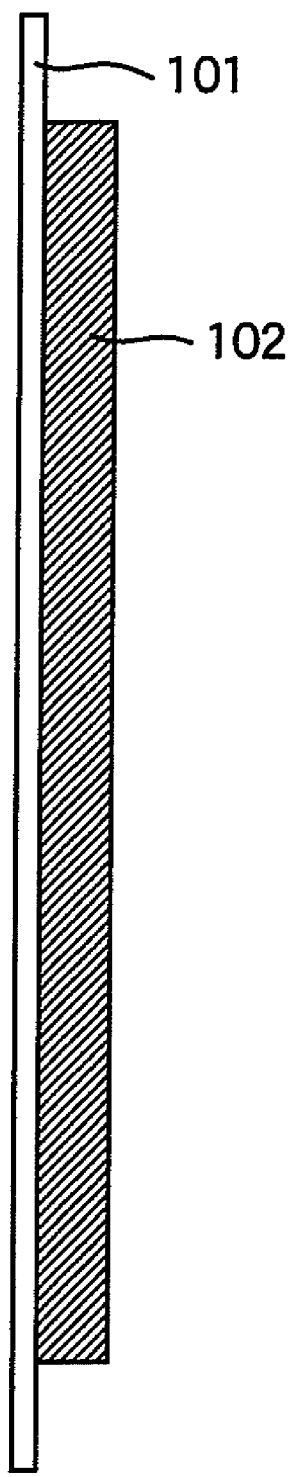
FIG. 1 is a schematic illustration of a cross sectional view showing a two-layered humidifying filter for a humidifier in an embodiment of the present invention.

FIG. 1 is a schematic illustration of a cross sectional view showing a two-layered humidifying filter for a humidifier in an embodiment of the present invention. The two-layered humidifying filter includes a separating layer 101, and a water-releasing layer 102 disposed adjacent to one side of the separating layer 101. A humidifier according to an embodiment is so configured that the separating layer 101 is arranged in the humidifier where a dry gas containing a small amount of water vapor such as an oxidant gas or a fuel gas flows in a side of the water-releasing layer 102 of the separating layer 101, and where a wet gas containing a large quantity of water vapor flows in the other side of the separating layer 101.

Such a humidifying filter including a separating layer and a water-releasing layer disposed one side of the separating layer is hereinafter referred to as a "two-layered humidifying filter".

A humidifying filter according to an embodiment of the present invention includes a separating layer 101 integrated with a water-releasing layer 102, as shown in FIG. 1. The separating layer 101 acts to separate a dry gas and a wet gas. The water-releasing layer 102 acts to supply the moisture to the dry gas, where the moisture is fed from the wet gas flowing an opposite side through the separating layer.

The moisture can move or transit through the separating layer 101 by means of a diffusion phenomenon. The moisture diffusion occurs due to a difference in a partial pressure of the water vapor as a driving force. The moisture can be in the form of liquid phase or vapor phase.

The water-releasing layer 102 is configured to retain the moisture received from the separating layer 101 and to humidify a dry gas by contacting with the dry gas.

These separating layer 101 and water-releasing layer 102 may be integrated, e.g., by adhesive bonding, clamping, or fixing with a sealant and may be housed in a unit of the humidifier or mounted to the fuel cell. Thus, a gas before feeding to the cell is humidified and the humidified gas is fed to the cell, thereby an electrolyte membrane is kept being humidified satisfactorily and having a low electric resistance.

The separating layer 101 may include a hydrophilic polymer membrane, an ion-exchange resin membrane, or a cellulosic sheet such as a nonwoven fabric or paper. It can also include a non-hydrophilic porous polymer membrane or a nonwoven polymer sheet, as long as it is moisture-permeable. A water-releasing layer may include a hydrophilic and water-retainable material according to an embodiment of the invention. However, any other materials for the separating layer can be used as long as it is moisture-permeable. A separating layer is more preferably one that is highly moisture-permeable and is impermeable (gastight) to the oxygen gas and the nitrogen gas. In order to enhance affinity for the moisture and moisture permeability of the separating layer, the separating layer 101 preferably includes a material having an oxygen-containing functional group on its surface. Such oxygen-containing functional groups include hydroxyl group, carbonyl group, and ether group.

On the other hand, a material for the separating layer 101 is preferably one having a contact angle with a water droplet on its surface of substantially 0 degree or a contact angle of 20 degrees or less. The contact angle herein is an index of hydrophilicity and is determined by measuring a contact angle between a water droplet and the surface of the material. Here, "contact angle of substantially zero degree" means that water droplet is substantially fully absorbed by the material, and it is difficult to measure the contact angle. The impermeability (gastightness) to the oxygen gas and the nitrogen gas, and/or the moisture permeability may vary depending on a material constituting the separating layer 101 and on the atmosphere surrounding the separating layer 101. The separating layer 101 may have, e.g., an average capillary diameter of 0.01 to 0.1 μm and a thickness of 10 μm to 100 μm.

The water-releasing layer 102 of the two-layered humidifying filter as illustrated in FIG. 1 is configured to retain the moisture as a liquid and is preferably composed of a porous material. The water-releasing layer 102 preferably has an average pore diameter larger than that of the separating layer 101. A porous material constituting the water-releasing layer 102 preferably has a high porosity, so as to retain a larger amount of water therein. Accordingly, the water-releasing layer 102 preferably has an average pore diameter of 1 to 100 μm and has a high porosity of 50% or more and less than 100%. The porosity is more preferably 80% or more. The porosity in terms of its upper limit is preferably 90% or less, in view of the pore diameter of the porous material. A porous material for constituting the water-releasing layer 102 is preferably hydrophilic and has a contact angle with a water droplet on its surface of substantially 0 degree or a contact angle of 20 degrees or less. As mentioned above, "contact angle of substantially zero degree" means a water droplet is substantially fully absorbed by the material, and it is difficult to measure the contact angle. The water-releasing layer 102 may have a thickness of 1 to 3 mm so as to yield a compact humidifier while the water-releasing layer 102 keeps to act as a moisture-permeable layer. A porous material for constituting the water-releasing layer 102 preferably has water absorptivity larger than that of the separating layer 101. This is because the resulting water-releasing layer 102 can satisfactorily receive the moisture from a wet gas, retain the moisture and feed the retained moisture to a dry gas. The water absorptivity herein means the quantity of moisture (water) to be contained in the material, and is defined as a value determined by multiplying the apparent volume of the porous material by the porosity.

Examples of a material for the water-releasing layer 102 include cellulosic paper containing pulp and an acrylic resin. The water-releasing layer 102 may be prepared, e.g., by stacking plural sheets of such cellulosic paper each having a thickness of about 0.5 mm. On the other hand, a material for the separating layer 101 can be, e.g., a proton-conductive membrane such as a perfluorosulfonic acid membrane.

The moisture migrates from a wet gas to the water-releasing layer 102 and is stored as liquid water in the water-releasing layer 102. A dry gas can be humidified stably and appropriately even when the flow rates of the wet gas and dry gas vary under some operating conditions, since the humidifying filter is capable of buffering against such change. Thus, it is not necessary that the structure of the humidifier change significantly for such variation of the operating conditions.

The separating layer 101 and the water-releasing layer 102 may be bonded, e.g., with a rubber adhesive. In this case, an adhesive layer between the two layers preferably has a minimum thickness so as not to occlude pores of the layers. However, occlusion of some pores is substantially trivial, as long as an area of non-occluded (open) pores is relatively large.

Any material will be used for bonding the separating layer 101 and the water-releasing layer 102, as long as it has water resistance, does not yield a large amount of water-insoluble impurities, and is thermally stable at temperatures where the fuel cell is operated. Examples of such a material satisfying these requirements include epoxy resins. The water-releasing layer 102 and the separating layer 101 may also be fixed with each other, e.g., using fine resinous grommeted fixing parts. They can also be bonded by a hot melt procedure in which spot-like hot melt procedure is conducted at certain intervals.

Figure 2:
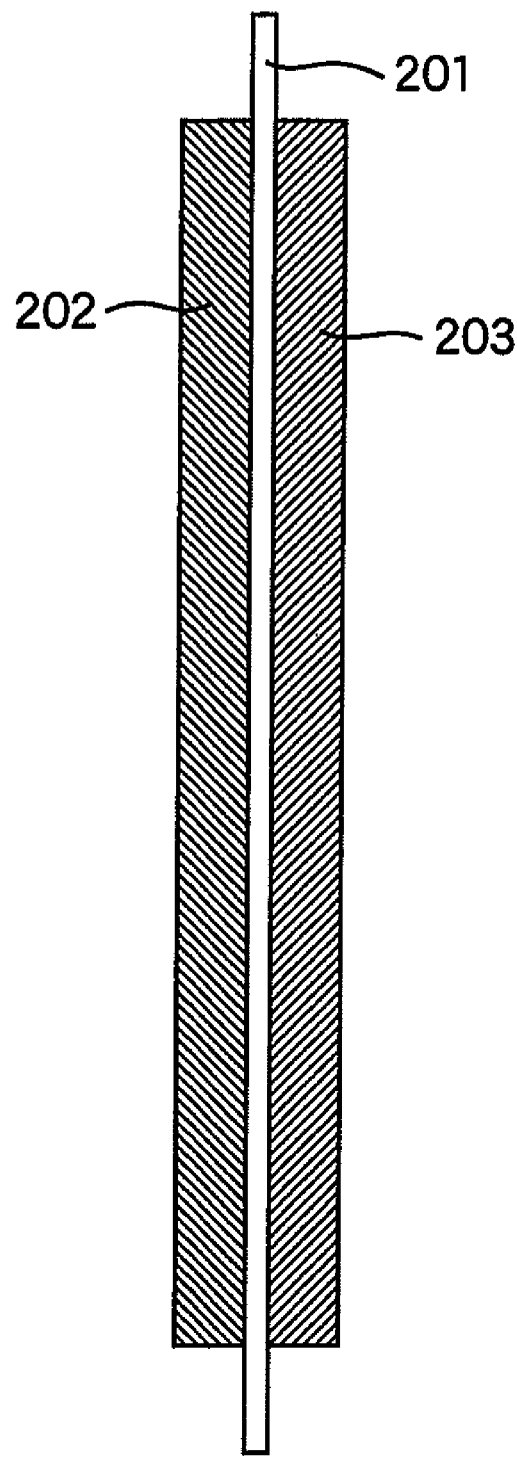
FIG. 2 is a schematic illustration of a cross sectional view showing a three-layered humidifying filter for a humidifier in another embodiment of the present invention.

Next, another embodiment according to the present invention will be described below. FIG. 2 is a schematic illustration of a cross sectional view showing a three-layered humidifying filter for a humidifier in another embodiment of the present invention. The three-layered humidifying filter includes a separating layer 201, a water-absorbing layer 202 disposed on one side of the separating layer 201, and a water-releasing layer 203 disposed on the other side. A humidifying filter having such a three layer structure is hereinafter referred to as a "three-layered humidifying filter".

A humidifier according to this embodiment is so configured that the separating layer 201 is arranged in the humidifier where a wet gas flows in a side of the water-absorbing layer 202, and where a dry gas (oxidant gas or fuel gas) flows in a side of the water-releasing layer 203.

The separating layer 201 and the water-releasing layer 203 may include materials having the same functions as in the separating layer 101 and the water-releasing layer 102, respectively, of the two-layered humidifying filter.

The water-absorbing layer 202 may include a material having the same functions as in the separating layer 201. Further, a three-layered humidifying filter can be prepared according to a similar procedure to that in the preparation of the two-layered humidifying filter.

In a humidifier according to this embodiment, the water vapor in a wet gas is caught by the water-absorbing layer 202, moves through the separating layer 201, reaches the water-releasing layer 203, and is released into a dry gas. The humidifier according to this embodiment may have a buffering effect more satisfactorily than a humidifier according to the above-mentioned embodiment using a two-layered humidifying filter.

Next, yet another embodiment according to the present invention will be described below. According to this embodiment, at least one of the water-absorbing layer 202 and the water-releasing layer 203 has a corrugated structure. A layer with a corrugated structure can more easily receive and release moisture. The resulting humidifier can efficiently humidify a dry gas even though it is compact.

Figure 3:
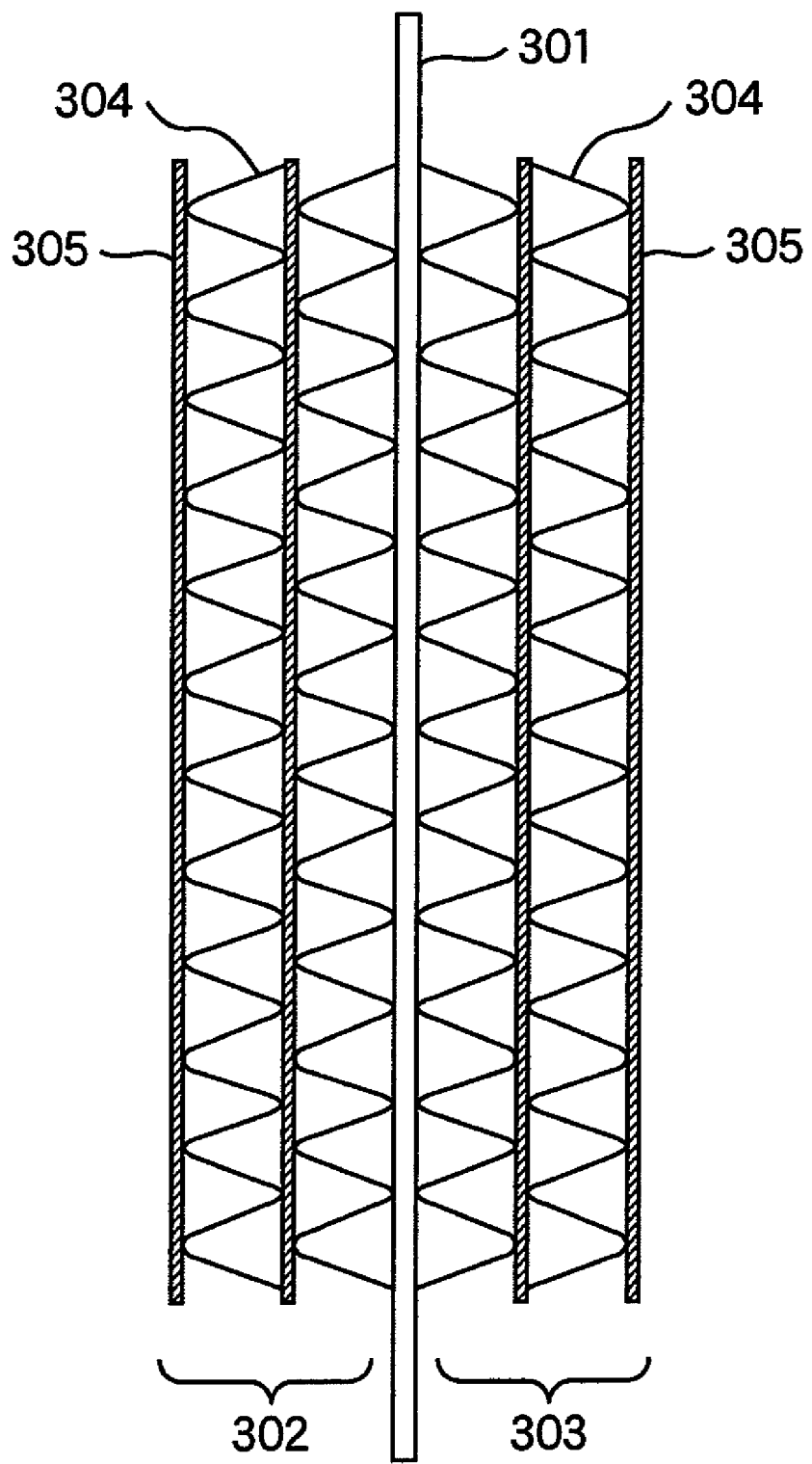
FIG. 3 is a schematic illustration of a cross sectional view showing a three-layered humidifying filter having a corrugated structure for a humidifier in yet another embodiment of the present invention.

FIG. 3 is a schematic illustration of a cross sectional view showing a three-layered humidifying filter having a corrugated structure for a humidifier in yet another embodiment of the present invention. In the embodiment illustrated in FIG. 3, a water-absorbing layer 302 and a water-releasing layer 303 have corrugated structures and are arranged symmetrically. The numbers of layers constituting the corrugated structures may be the same as or different from each other between the water-absorbing layer 302 and the water-releasing layer 303.

The water-absorbing layer 302 and the water-releasing layer 303 illustrated in FIG. 3 each include corrugated layers 304 bonded with flat sheets 305. The corrugated layers 304 each include a hydrophilic sheet as molded to have a corrugated form. For easy stacking of corrugated layers 304, plural corrugated layers 304 are arranged in parallel and are integrated with the interposition of sheets 305.

The separating layer 301 may include a material having the same functions as in the separating layer 101 of the two-layered humidifying filter. The corrugated layers 304 and the hydrophilic sheets 305 may include materials having the same functions as in the water-releasing layer 102 of the two-layered humidifying filter.

The structure according to this embodiment is more advantageous to yield a gas having a higher humidity as compared with the two-layered humidifying filter (FIG. 1) and the three-layered humidifying filter (FIG. 2) (not corrugated), because the corrugated structure enables a larger contact area with a gas within a limited volume. For example, when a fuel cell is operated for power generation under conditions at a high gas flow rate and a high gas dew-point temperature, a humidifier with this structure can have a smaller size. According to this configuration, humidifying conditions can be controlled by adjusting the number of corrugated layers, and this avoids the significant modification in design typically of a sealing unit in the humidifier. Such a humidifying filter with a corrugated structure is hereinafter referred to as a "corrugated humidifying filter".

Some embodiments according to the present invention will be described below in further detail, by taking the humidification of an oxidant gas as an example. A gas to be humidified can also be a fuel gas.

Initially, a wet gas containing a large quantity of moisture (water vapor) is taken by the water-absorbing layer 202 (302) of the three-layered humidifying filter (FIG. 2) or the corrugated humidifying filter (FIG. 3). The wet gas is more preferably an oxidant gas exhausted from each unit cell and containing water created as a result of the power generation.

The moisture taken or absorbed by the water-absorbing layer 202 (302) passes through the separating layer 201 (301) and reaches the water-releasing layer 203 (303). When a two-layered humidifying filter as illustrated in FIG. 1 is used, the moisture from a wet gas directly passes through the separating layer 101 and reaches the water-releasing layer 102, since the two-layered humidifying filter does not include a water-absorbing layer.

As mentioned before, the separating layer 201 (101, 301) is configured to transfer moisture to the water-releasing layer 203 (102, 303). The moisture herein can be in the form of a gas phase (water vapor) or a liquid phase. It is not necessary that the thicknesses and porosities of the water-releasing layer 203 (102, 303) and the water-absorbing layer 202 (302) are the same as those of the separating layer 201 (101, 301). When a filter should have a certain mechanical strength to maintain the water-releasing layer 203 (102, 303) and the water-absorbing layer 202 (302), such mechanical strength can be ensured by increasing the thickness of, and/or reducing the porosity of the separating layer 201 (101, 301). The separating layer 201 (101, 301) may include a non-hydrophilic material. However, it preferably includes a material having an oxygen-containing functional group on its surface in order to enhance affinity for the moisture (hydrophilicity) of the separating layer. As a result, it can transfer a larger amount of water. Such oxygen-containing functional groups include, e.g., hydroxyl group, carbonyl group, and ether group.

The water-releasing layer 203 (102, 303) has a single-layer structure or a corrugated structure and is configured to transfer the moisture taken by the water-absorbing layer 202 (302) to a dry oxidant gas before feeding to the fuel cell stack for the power generation.

By using a two-layered, three-layered, or corrugated humidifying filter, the size of a polymer electrolyte fuel cell system can be reduced according to an embodiment of the present invention. In particular, when a corrugated humidifying filter is used, the dew-point temperature in humidification of a gas can be controlled easily by adjusting the number of corrugated layers. As a result, the humidifying filter can be applied to the humidification of gases under various operating conditions only by changing its dimensions in view only of the thickness of corrugated layers. This avoids significant changes of design such as the piping and the size of a casing for the humidifying filter.

Figure 4:
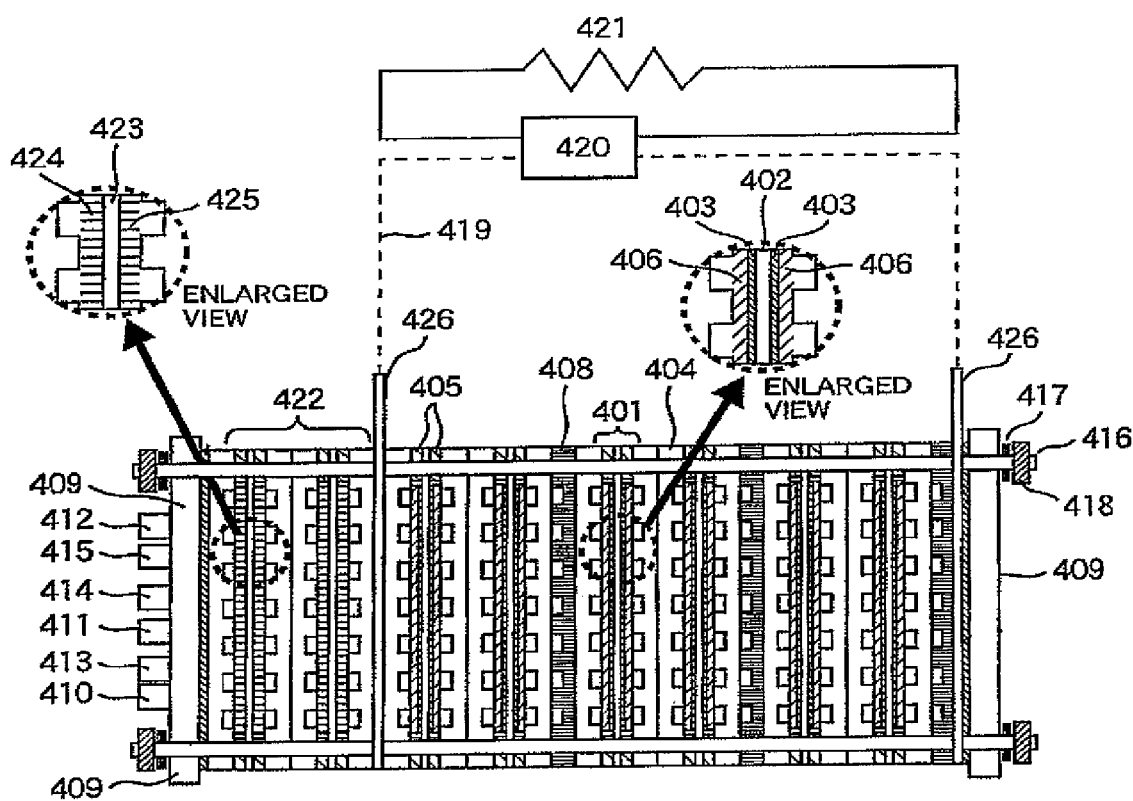
FIG. 4 is a schematic illustration of a polymer electrolyte fuel cell system including a humidifier having a humidifying filter according to an embodiment of the present invention.

Next, a polymer electrolyte fuel cell system according to an embodiment of the present invention will be described below. FIG. 4 is a schematic illustration of a polymer electrolyte fuel cell system including a humidifier having a humidifying filter according to an embodiment of the present invention.

A polymer electrolyte fuel cell system illustrated in FIG. 4 includes a humidifier having the corrugated humidifying filter illustrated in FIG. 3. A water-absorbing layer 424 and a water-releasing layer 425 are arranged on a separating layer 423 in a side where a wet gas flows and in the other side where a dry gas flows, respectively, as illustrated in an enlarged view (left hand) in FIG. 4. A humidifying unit 422 is composed of two humidifiers wherein each of the two humidifiers includes the water-absorbing layer 424, the water-releasing layer 425, and the separating layer 423.

The polymer electrolyte fuel cell system includes a fuel cell stack comprising plural cells 401, the humidifying unit 422, and an inverter 420. A humidifier herein may be integrated as a humidifying unit 422 with a fuel cell stack, as illustrated in FIG. 4. Alternatively, it may be mounted in a fuel cell system independently from a fuel cell stack.

The fuel cell system illustrated in FIG. 4 is configured as follows. Dry air is taken through an air supply port 410 and is humidified in the humidifying unit 422 before feeding to the fuel cell stack for the power generation. The humidification is conducted by transferring moisture (water or water vapor) from an air exhaust gas to the dry air. The air exhaust gas contains water vapor created as a result of the power generation. Then, the humidified air is fed to the fuel cell stack (right hand in FIG. 4). With reference to another enlarged view (right hand) in FIG. 4, each of the cells 401 includes a membrane electrode assembly (MEA), gas diffusion layers 406, and separators 404 sandwiching these components. The membrane electrode assembly (MEA) includes an electrolyte membrane 402 and electrode layers 403 disposed on both sides of the electrolyte membrane 402. As an example of the present invention, a fuel cell system having thirty cells as shown in FIG. 4 is manufactured, but the number of cells is not limited thereto.

Gaskets 405 are arranged on sides where adjacent separators are bonded, so as to prevent the leakage of gas from cells. In addition, coolant separators 408 are arranged. The coolant separators 408 are configured to allow a coolant to pass therethrough so as to remove heat generated along with the power generation.

An exhaust gas of the oxidant gas contains water created as a result of the power generation. The oxidant-consumed exhaust gas flows from the individual cells 401 toward the left hand in FIG. 4, feeds moisture to the air (oxidant gas before power generation) in the humidifying unit 422, and is discharged through an air exhaust port 411 out of the cell system.

A fuel gas is fed through a fuel supply port 412, is transferred via a manifold, passes through the humidifying unit 422 without modification, and reached the fuel cell stack. The fuel undergoes an oxidation reaction, i.e., power generation in the fuel cell stack. An exhaust gas after the reaction flows toward the left hand in FIG. 4 and is discharged through a fuel exhaust port 413 out of the cell system.

A coolant is fed through a coolant supply port 414 toward the right hand in FIG. 4 and is fed to the coolant separator 408. Thus, the coolant acts to receive heat generated as a result of power generation and to make the cell temperature constant. The heated coolant is discharged through a coolant exhaust port 415 out of the cell system.

The humidifying unit 422 and the fuel cell stack are integrally cramped with end plates 409 using bolts 416, coned disc springs 417, and nuts 418 to set up a fuel cell. A fuel cell according to this embodiment is referred to as Fuel Cell E1.

Fuel Cell E1 is configured as follows. A cable 419 is connected to an external terminal 426; an inverter 420 serves to invert a direct-current power to an alternating-current power; and an external load 421 such as a heater or a motor consumes electric power.

A power generation test was conducted, in which an electric power is supplied to the external load 421. Before the test, an air before feeding to the cell is saturated so as to have a dew-point temperature of 70° C. using a bubbler. The saturated air is fed to Fuel Cell E1. Simultaneously, a saturated hydrogen having a dew-point temperature of 70° C. is fed to Fuel Cell E1, and running-in is carried out at a current density of 0.2 A/cm$^2$. The electrolyte membrane is in a dry state immediately after the assemblage of the fuel cell, and the running-in allows the electrolyte membrane to be somewhat humidified. This state is referred to as the initial state. A cell voltage in the initial state is 0.72 V. A constant electric power loading device is used as the external load 421.

Next, non-humidified air at 30° C. and relative humidity of 50% is fed to Fuel Cell E1, and the power generation of the cell is continued. A power controllable heater is used as the external load 421. Ten hours into the operation, the moisture content in the fuel cell stack becomes constant and the cell voltage becomes stable. The cell voltage in this state is 0.71 V. This result demonstrates that, even when non-humidified air (oxidant gas) is fed to Fuel Cell E1, Fuel Cell E1 can generate power without a significant power drop, and this is by the function of the humidifying unit 422.

As a referential test, power generation is carried out by the above procedure, except for saturating air so as to have a dew-point temperature of 50° C., and feeding the saturated air to Fuel Cell E1 instead of aforementioned non-humidified air. The cell voltage in this test is 0.72 V, substantially equal to that in the above power generation test. It is strongly suggested that the humidification function of the humidifying unit 422 yields air at least equivalent to the saturated air having a dew-point temperature of 50° C.

Next, a fuel cell is prepared by the above procedure, except for using a two-layered humidifying filter (FIG. 1) instead of the corrugated humidifying filter in FIG. 4. The left enlarged view in FIG. 4 illustrates a water-absorbing layer 424 on the left hand of the separating layer 423. However, the fuel cell according to this embodiment uses a two-layered humidifying filter and thereby does not include a water-absorbing layer 424.

The configuration of the cell is not changed, and the number of unit cells is set at thirty. The fuel cell according to this embodiment is referred to as Fuel Cell E2.

Non-humidified air at 30° C. and relative humidity of 50% is fed to Fuel Cell E2, and the power generation of the cell is continued. Ten hours into the operation, the moisture content in the fuel cell stack becomes constant and the cell voltage becomes stable. The cell voltage in this state is 0.72 V. This result demonstrates that, even when non-humidified air (oxidant gas) is fed to Fuel Cell E2, Fuel Cell E2 can generate power without a significant power drop by the function of the humidifying unit 422. Fuel Cell E2 shows a cell voltage of 0.72 V, somewhat higher than that (0.71 V) of Fuel Cell E1. This is probably because Fuel Cell E2 has a somewhat higher moisture exchange efficiency, and the air before feeding to the cell has a somewhat higher dew-point temperature. As a referential test for this embodiment, power generation is carried out by the above procedure, except for saturating air so as to have a dew-point temperature of 50° C., and feeding the saturated air to Fuel Cell E2 instead of aforementioned non-humidified air. The cell voltage in this test is 0.71 V, substantially equal to that in the above power generation test. It is strongly suggested that the humidification function of the humidifying unit 422 yields air at least equivalent to the saturated air having a dew-point temperature of 50° C.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polymer electrolyte fuel cell, comprising:
a humidifier; and
a fuel cell stack, the fuel cell stack including plural cells each containing:
a pair of electrodes, and
a proton-conductive electrolyte membrane arranged between the pair of electrodes,
wherein an oxidant gas or a fuel gas passes through the humidifier before feeding to the fuel cell stack, and a wet gas containing water or water vapor passes through the humidifier,
wherein the humidifier includes a porous separating layer and a hydrophilic water-releasing layer,
wherein the separating layer has pores having an average pore diameter of 0.01 to 0.1 µm and is configured to separate the wet gas from the oxidant gas or the fuel gas in the humidifier and allow transit of moisture through the pores in the vapor phase, and
wherein the hydrophilic water-releasing layer has pores in which moisture is retained in the liquid phase having an average pore diameter of 1 to 100 µm and is disposed in a side of the oxidant gas or the fuel gas to the separating layer in the humidifier.

2. The polymer electrolyte fuel cell according to claim 1, wherein:
a hydrophilic water-absorbing layer is disposed in the other side of the separating layer where the wet gas flows.

3. The polymer electrolyte fuel cell according to claim 2, wherein:
the water-absorbing layer has a corrugated structure.

4. The polymer electrolyte fuel cell according to claim 1, wherein:
the water-releasing layer has a corrugated structure.

5. The polymer electrolyte fuel cell according to claim 1, wherein the separating layer is selected from the group consisting of a hydrophilic polymer membrane, an ion-exchange resin membrane and a cellulosic sheet.

6. The polymer electrolyte fuel cell according to claim 1, wherein the separating layer the separating layer includes a material having an oxygen-containing functional group on its surface, the oxygen-containing functional groups being selected from the group consisting of hydroxyl groups, carbonyl groups and ether groups.

7. The polymer electrolyte fuel cell according to claim 1, wherein the separating layer has a thickness of 10 µm to 100 µm.

8. The polymer electrolyte fuel cell according to claim 1, wherein the separating layer has a contact angle with a water droplet on its surface of 20 degrees or less.

9. The polymer electrolyte fuel cell according to claim 1, wherein the separating layer has a contact angle with a water droplet on its surface of substantially 0 degrees.

10. The polymer electrolyte fuel cell according to claim 1, wherein the hydrophilic water-releasing layer has a porosity of 50% or more and less than 100%.

11. The polymer electrolyte fuel cell according to claim 1, wherein the hydrophilic water-releasing layer has a porosity of 80% to 90%.

12. The polymer electrolyte fuel cell according to claim 1, wherein the hydrophilic water-releasing layer has a thickness of 1 to 3 mm.

13. The polymer electrolyte fuel cell according to claim 1, wherein the hydrophilic water-releasing layer has a contact angle with a water droplet on its surface of 20 degrees or less.

14. The polymer electrolyte fuel cell according to claim 1, wherein the hydrophilic water-releasing layer has a contact angle with a water droplet on its surface of substantially 0 degrees.

15. The polymer electrolyte fuel cell according to claim 1, wherein the hydrophilic water-releasing layer has a porosity of 50% or more and less than 100%.

16. The polymer electrolyte fuel cell according to claim 1, wherein the hydrophilic water-releasing layer is selected from the group consisting of cellulosic paper containing pulp and an acrylic resin.

17. A polymer electrolyte fuel cell, comprising:
a humidifier; and
a fuel cell stack, the fuel cell stack including plural cells each containing:
a pair of electrodes, and
a proton-conductive electrolyte membrane arranged between the pair of electrodes,
wherein an oxidant gas passes through the humidifier before feeding to the fuel cell stack, and a cathode exhaust gas exhausted from the fuel cell stack to passes through the humidifier,
wherein the humidifier includes a porous separating layer and a hydrophilic water-releasing layer,
wherein the separating layer has pores having an average pore diameter of 0.01 to 0.1 µm and is configured to separate the cathode exhaust gas from the oxidant gas and allow transit of moisture through the pores in the vapor phase, and
wherein the hydrophilic water-releasing layer has pores in which moisture is retained in the liquid phase having an average pore diameter of 1 to 100 µm and is disposed in a side of the oxidant gas to the separating layer in the humidifier.

18. The polymer electrolyte fuel cell according to claim 17, wherein:
a hydrophilic water-absorbing layer is disposed in the other side of the separating layer where the wet gas flows.

19. The polymer electrolyte fuel cell according to claim 18, wherein:
the water-absorbing layer has a corrugated structure.

20. The polymer electrolyte fuel cell according to claim 17, wherein:
the water-releasing layer has a corrugated structure.

* * * * *